United States Patent
Shao et al.

(10) Patent No.: US 12,453,347 B2
(45) Date of Patent: Oct. 28, 2025

(54) PESTICIDE EMULSION CONCENTRATES CONTAINING NATURAL OR PETROLEUM DERIVED OILS AND METHODS OF USE

(71) Applicant: CORTEVA AGRISCIENCE LLC, Indianapolis, IN (US)

(72) Inventors: Hui Shao, Carmel, IN (US); Holger Tank, Indianapolis, IN (US)

(73) Assignee: CORTEVA AGRISCIENCE LLC, IN (US)

( * ) Notice: Subject to any disclaimer, the term of this patent is extended or adjusted under 35 U.S.C. 154(b) by 0 days.

(21) Appl. No.: 18/310,006

(22) Filed: May 1, 2023

(65) Prior Publication Data

US 2023/0263158 A1 Aug. 24, 2023

Related U.S. Application Data

(63) Continuation of application No. 14/535,455, filed on Nov. 7, 2014, now abandoned.

(60) Provisional application No. 61/901,562, filed on Nov. 8, 2013.

(51) Int. Cl.
*A01N 25/04* (2006.01)
*A01N 25/06* (2006.01)
*A01N 37/38* (2006.01)
*A01N 39/04* (2006.01)
*A01N 57/20* (2006.01)

(52) U.S. Cl.
CPC .............. *A01N 25/04* (2013.01); *A01N 25/06* (2013.01); *A01N 37/38* (2013.01); *A01N 39/04* (2013.01); *A01N 57/20* (2013.01)

(58) Field of Classification Search
CPC ........ A01N 57/20; A01N 39/04; A01N 25/06; A01N 37/36; A01N 37/40; A01N 25/04; A01N 37/38
See application file for complete search history.

(56) References Cited

U.S. PATENT DOCUMENTS

| | | | |
|---|---|---|---|
| 5,529,975 A | 6/1996 | Chamberlain | |
| 5,674,514 A | 10/1997 | Hasslin | |
| 2002/0025986 A1 | 2/2002 | Rodham et al. | |
| 2008/0207453 A1* | 8/2008 | Kramer | A01N 39/04 504/144 |
| 2009/0062127 A1 | 3/2009 | Liu | |
| 2009/0203528 A1* | 8/2009 | Xu | A01N 25/04 514/546 |
| 2011/0021350 A1 | 1/2011 | Reap | |
| 2011/0082039 A1 | 4/2011 | Keeney et al. | |
| 2011/0124590 A1 | 5/2011 | Sowa et al. | |
| 2011/0257012 A1 | 10/2011 | Stagg et al. | |
| 2013/0237419 A1 | 9/2013 | Shao et al. | |
| 2013/0252812 A1 | 9/2013 | Shao et al. | |
| 2013/0252817 A1 | 9/2013 | Shao et al. | |
| 2013/0260996 A1* | 10/2013 | Wilson | A01N 37/40 504/362 |
| 2015/0133299 A1 | 5/2015 | Shao et al. | |

FOREIGN PATENT DOCUMENTS

| | | |
|---|---|---|
| CN | 101616581 A | 12/2009 |
| CN | 101653142 A | 2/2010 |
| CN | 102283194 A | 12/2011 |
| WO | 2007014386 A2 | 2/2007 |
| WO | 2008030749 A2 | 3/2008 |
| WO | 2008145183 A1 | 12/2008 |
| WO | 2009032481 A2 | 3/2009 |
| WO | 2011156320 A2 | 12/2011 |
| WO | 2012097149 A1 | 7/2012 |
| WO | 2012115070 A1 | 8/2012 |

OTHER PUBLICATIONS

Elsik C.M., et al., "Novel Lipophilic Surfactant Adjuvants for Spray-Drift Reduction," Pesticide Formulation and Delivery Systems: 32nd vol. Innovating Legacy Products for New Uses, 100 Barr Harbor Drive, PO Box C700, West Conshohocken, PA 19428-2959, ASTM International, Feb. 13, 2013, pp. 114-122, DOI: 10.1520/STP1558104616, ISBN 978-0-8031-7544-0, XP055375607.
Extended European Search Report for European Application No. 14860867.2, mailed Jun. 8, 2017, 7 Pages.
International Preliminary Report on Patentability for International Application No. PCT/US2014/064489, mailed May 19, 2016, 8 Pages.
International Search report and Written Opinion for International Application No. PCT/US2014/064489, mailed Jan. 26, 2015, 16 Pages.
Suzuki T., et al., 2004, vol. 77, No. 10, pp. 462-469, p. 462, Right Column, Lines 1-2, ISSN 0004461530.
Teske M.E., et al., "The Role of Small Droplets in Classifying Drop Size Distributions," ILASS Americas 17th Annual Conference, Arlington VA, 2004, 8 Pages.
Wolf R.E., "Keys to Spray Drift Management," Microsoft PowerPoint Presentation, 64 Pages, Oct. 8, 2013, Retrieved from URL: www.bae.ksu.edu/faculty/wolf/PowerPoint.htm.
Yu L., et al., "Study on the Stability of Pesticide Emulsion in Water Prepared from Liquid Original Drug," World Pesticides, 2009, vol. 31, No. 6, pp. 39-44.

* cited by examiner

*Primary Examiner* — Bethany P Barham
*Assistant Examiner* — Danielle Johnson

(57) ABSTRACT

Aqueous pesticide concentrates containing a pesticide (such as an auxinic herbicide), a surfactant, and a naturally or petroleum derived oil and the use of aqueous pesticide spray mixtures incorporating such concentrates are described. The aqueous pesticide concentrates described herein include from 5 to 90 weight percent of a pesticide (such as an auxinic herbicide), from 0.1 to 20 weight percent of a surfactant, and from 0.1 to 20 weight percent of a naturally or petroleum derived oil. The aqueous pesticide concentrates are stable oil-in-water emulsions that form a stable emulsion upon dilution into a spray solution.

15 Claims, No Drawings

PESTICIDE EMULSION CONCENTRATES CONTAINING NATURAL OR PETROLEUM DERIVED OILS AND METHODS OF USE

CROSS-REFERENCE TO RELATED APPLICATION

This application claims priority to U.S. Provisional Patent Application Ser. No. 61/901,562, filed Nov. 8, 2013, the disclosure of which is hereby incorporated herein in its entirety by this reference.

BACKGROUND

Agricultural spraying by economical and available technologies uses hydraulic spray nozzles that inherently produce a wide spectrum of spray droplet sizes. The potential for these spray droplets to drift from the initial, desired site of application is found to be a function of droplet size, with smaller droplets having a higher propensity for off-target movement. Significant research efforts, involving numerous field trials, wind tunnel tests and subsequent generation of predictive math models have led to a greatly enhanced understanding of the relationship between spray droplet size and potential for off-target drift. Although other factors such as meteorological conditions and spray boom height contribute to the potential for drift, spray droplet size distribution has been found to be a predominant factor. Teske et. al. (Teske M. E., Hewitt A. J., Valcore, D. L. 2004. *The Role of Small Droplets in Classifying Drop Size Distributions* ILASS Americas 17$^{th}$ Annual Conference: Arlington VA) have reported a value of <156 microns (μm) as the fraction of the spray droplet distribution that contributes to drift. Robert Wolf (Wolf, R. E., Keys to Spray Drift Management, Microsoft® PowerPoint Presentation (filename: Drift Minimization—2009), available at www.bae.ksu.edu/faculty/wolf/PowerPoint.htm, last viewed Oct. 8, 2013) cites a value of <200 μm as the driftable fraction. A good estimation of droplet size likely to contribute to drift, therefore, is the fraction below about 150 μm.

The negative consequences of off-target movement can be quite pronounced. Some herbicides have demonstrated very sensitive phytotoxicity to particular plant species at extremely low parts per million (ppm) or even parts per billion (ppb) levels, resulting in restricted applications around sensitive crops, orchards, and residential plantings. For example, the California Dept of Pesticide Regulation imposes buffers of ½-2 miles for propanil containing herbicides applied aerially in the San Joaquin valley.

SUMMARY

The methods and compositions described herein include aqueous pesticidal concentrates containing a pesticide, a surfactant, and a naturally or petroleum derived oil and the use of aqueous pesticide spray mixtures incorporating such concentrates. The aqueous pesticide concentrates described herein include from 5 to 90 weight percent of a pesticide, from 0.1 to 20 weight percent of a surfactant, and from 0.1 to 20 weight percent of a naturally or petroleum derived oil.

These aqueous pesticide concentrates are stable oil-in-water emulsions that form a stable emulsion upon dilution into a spray solution. The methods for reducing spray drift during pesticide spray application to control plant growth include providing an aqueous pesticide concentrate as described, adding the aqueous pesticide concentrate to a spray tank containing water to form a stable emulsion, and spraying the stable emulsion to control pests.

DETAILED DESCRIPTION

Methods and compositions to reduce agricultural spray drift are described herein. The methods and compositions reduce the amount of driftable fines of a pesticide spray in both aerial and ground spray applications. The methods include the use of aqueous agricultural spray mixtures incorporating naturally or petroleum derived oils and one or more pesticides.

The aqueous pesticide concentrates as described herein include from 5 to 90 weight percent of a pesticide, from 0.1 to 20 weight percent of a surfactant; and from 0.1 to 20 weight percent of one or more naturally or petroleum derived oils as described herein wherein the naturally or petroleum derived oil is dispersed as discrete droplets in the aqueous pesticide concentrate to form a stable oil-in-water emulsion with a droplet particle size from about 0.01 micron (μm) to about 20 μm.

The methods and compositions described herein to reduce spray drift by incorporating naturally or petroleum derived oils into an aqueous agricultural spray mixture applies to the application of any pesticide or crop protection agent including herbicides, herbicide safeners, fungicides and insecticides. The pesticide or crop protection agent may be in the form of a water soluble derivative such as, for example, a water soluble salt of an auxinic herbicide.

Herbicides useful with the methods and compositions described herein include, for example, 2,4-D, acetochlor, aminopyralid, atrazine, benfluralin, clopyralid, cloransulam-methyl, cyhalofop-butyl, dicamba, diclosulam, dithiopyr, ethalfluralin, florasulam, flumetsulam, fluroxypyr, glufosinate, glyphosate, halauxifen, haloxyfop, isoxaben, MCPA, MCPB, MSMA, oryzalin, oxyfluorfen, pendimethalin, penoxsulam, picloram, propanil, pyroxsulam, quizalofop, tebuthiuron, triclopyr, trifluralin or mixtures thereof. Herbicides especially useful with the methods and compositions described herein include, for example, auxinic herbicides such as 2,4-D, 2,4-DB, MCPA, MCPB, aminocyclopyrachlor, aminopyralid, clopyralid, dicamba, fluroxypyr, halauxifen, picloram, triclopyr, or mixtures thereof. The methods and compositions described herein are most particularly useful for the application of herbicides that are subject to restricted applications around sensitive crops such as spray mixtures containing glyphosate, glufosinate, 2,4-D, triclopyr, dicamba, or mixtures thereof.

Herbicide safeners useful with the methods and compositions described herein include, for example, cloquintocet, flurazole, mefenpyr, and TI-35.

Insecticides useful with the methods and compositions described herein include, for example, organophosphates such as chlorpyrifos, chlorpyrifos-methyl, MAC insecticides such as halofenozide, methoxyfenozide and tebufenozide, pyrethroids such as cypermethrin, gamma-cyhalothrin and deltamethrin, sulfoximines such as sulfoxaflor and biologically derived pesticides such as spinosad and spinetoram.

Fungicides useful with the methods and compositions described herein include, for example, mancozeb, myclobutanil, fenbuconazole, zoxamide, propiconazole, quinoxyfen and thifluzamide.

Naturally derived oils useful with the methods and compositions described herein may be derived from or made from plant or animal sources and include, for example, triglyceride fatty acid esters such as vegetable oils, seed oils, or animal oils, or monoesters derived from vegetable, seed, or animal oils, and mixtures thereof. Examples of monoesters derived from vegetable, seed, or animal oils useful with the methods and composition described herein include fatty acid alkyl esters such as methyl caproate, methyl caprylate, methyl caprate, methyl laurate, methyl myristate, methyl palmitate, methyl stearate, methyl oleate, methyl linoleate, methyl linolenate, and mixtures thereof. Examples of triglyceride fatty acid esters useful with the methods and composition described herein include vegetable or a seed oils selected from soybean oil, rape seed oil, olive oil, almond oil, canola oil, omega-9 canola oil, castor oil, sunflower seed oil, coconut oil, corn oil, cotton seed oil, linseed oil, palm oil, peanut oil, safflower oil, sesame oil, tung oil, and mixtures thereof. Examples of commercially available, naturally derived oils useful with the methods and compositions described herein include: Stepan® 108, a caprylic/capric triglyceride and Steposol® C42, a methyl laurate/methyl myristate ester derived from coconut oil, which are both available from Stepan (Northfield, IL), and Agnique ME12-18, a mixture of $C_{12-18}$ fatty acid methyl esters, and Aqnique ME18-U, methyl oleate, which are both available from BASF (Florham Park, NJ).

Petroleum derived oils useful with the methods and compositions described herein include aromatic and paraffinic hydrocarbons such as, for example, one or more of petroleum fractions or hydrocarbons such as mineral oil, kerosene, paraffinic oils including normal paraffins, isoparaffins and cycloparaffins, mixed naphthalene and alkyl naphthalene fractions, aromatic solvents, particularly alkyl substituted benzenes such as xylene or propylbenzene fractions, and the like, and mixtures thereof. Examples of commercially available petroleum derived oils useful with the methods and compositions described herein include: Isopar™ M, Exxsol™ D110, Exxsol™ D60, Aromatic 100, and Aromatic 200 which are all available from ExxonMobil Chemical (Houston, TX).

The naturally or petroleum derived oil is dispersed as discrete droplets in the aqueous pesticide concentrates described herein to form a stable oil-in-water emulsion with an oil droplet particle size (volume mean diameter) from about 0.01 micron (μm) to about 20 μm, from about 0.1 μm to about 20 μm, from about 0.1 μm to about 10 μm, from about 1 μm to about 10 μm, or from about 1 μm to about 5 μm.

The surfactants useful with the methods and compositions described herein may be anionic or nonionic in character and include polymeric surfactants such as ABA block copolymers and AB block copolymers containing EO and PO blocks such as ethylene oxide-propylene oxide (EO-PO) block copolymers; alcohol alkoxylates; phosphate ester surfactants such as acids or salts of mono and dialkyl phosphate esters, acids or salts of ethoxylated mono and dialkyl phosphate esters, acids or salts of mono and dialkyl phosphate esters of ethoxylated tristyrylphenol and acids or salts of mono and dialkyl phosphate esters of ethoxylated phenol and ethoxylated alkylphenols; alkylbenzene sulfonates and mixtures thereof.

Examples of useful surfactants include: (1) ABA block copolymers having a hydrophilic portion of polyethylene oxide and a hydrophobic portion of poly(12-hydroxystearate), such as, for example, Atlox™ 4912 (Croda; Edison, NJ), having a molecular weight of about 5,000 and Termul™ 2510 (Huntsman International LLC; The Woodlands, TX); (2) EO-PO block copolymers, such as, for example, Atlas™ G-5000 (Croda; Edison, NJ), and the Pluronic® block copolymers (BASF; Florham Park, NJ), and the like; (3) alcohol alkoxylates, such as, for example, Termul™ 5429 (Huntsman International LLC; The Woodlands, TX); (4) alkylbenzene sulfonates, such as Biosoft® N-411 and Ninate® 411 (Stepan Company; Northfield, Illinois) and Tensiofix 9811HF and 9824HF (Ajinomoto-Omnichem, Louvain-la-Neuve, Belgium). Especially useful surfactants include ABA block copolymers and EO-PO block copolymers. The surfactant can be present in an amount from 1 g/kg to 200 g/kg, preferably from 1 g/kg to 50 g/kg of the total composition.

The aqueous pesticide spray mixtures as described herein may be applied in conjunction with one or more other active ingredients to control a wider variety of unwanted plants, fungi, or insects. When used in conjunction with the other active ingredients, the presently claimed compositions can be formulated with the other active ingredient or active ingredients as premix concentrates, tank mixed with the other active ingredient or active ingredients for spray application, or applied sequentially with the other active ingredient or active ingredients in separate spray applications.

An example of a composition as described herein that may be used in conjunction with another active ingredient comprises an aqueous pre-mix concentrate containing a mixture of an auxinic herbicide such as a water soluble salt of 2,4-D, a water soluble salt of triclopyr, or a water soluble salt of dicamba, or mixtures thereof, a water soluble salt of glyphosate, and a fatty acid alkyl ester, a triglyceride fatty acid ester, an aromatic hydrocarbon, and/or a paraffinic hydrocarbon. Such aqueous pre-mix herbicidal concentrates may be diluted from 1 to 2000 fold in water at the point of use depending on the agricultural practices and used in spray applications to control weeds in crops.

In some situations, the aqueous pesticide spray mixtures may contain one or more biocides. Biocides may be present in the composition from about 0.001 wt % to about 0.1 wt %. In embodiments, the one or more biocides may be present in the composition at 0.001 wt %, 0.005 wt %, 0.01 wt %, 0.02 wt %, 0.03 wt %, 0.04 wt %, 0.05 wt %, 0.06 wt %, 0.07 wt %, 0.08 wt %, 0.09 wt %, or 0.1 wt %. Examples of biocides include, but are not limited to, bactericides, viricides, fungicides, parasiticides, and the like. Examples of biocide active ingredients include, but are not limited to, phenol compounds (such as phenol, thymol, pentachlorophenol, cresol, and p-chloro-m-xylenol), aldehydic compounds (such as formaldehyde, glutaraldehyde, and paraformaldehyde), acid compounds (such as benzoic acid, sorbic acid, mucochloric acid, and mucobromic acid), esters of p-hydroxybenzoic acid (such as methyl-p-hydroxybenzoate and butyl-p-hydroxybenzoate), rare earth salts, amines, disulfides, heterocyclic compounds (such as thiazinium salts, thiazolinones, and benzimidazoles), quaternary ammonium salts, organic mercury compounds, hexamethylenebiguanide hydrochlorides, benzalkonium chlorides, polyamino propylbiguanides, and 1-2-benzisothiazoline-3-ones. For specific example, an aqueous pesticide spray mixture may comprise Proxel® GXL (Arch Chemicals Inc., Atlanta, GA) as a biocide.

When the aqueous pesticide spray mixtures described herein contain water soluble salts of auxinic herbicides and/or water soluble salts of glyphosate, suitable cations contained in these salts include isopropyl ammonium, dimethyl ammonium, triethyl ammonium, monoethanol ammonium, diethanol ammonium, triethanol ammonium, dimethylethanol ammonium, diethyleneglycol ammonium, triisopropanol ammonium, tetramethyl ammonium, tetraethyl ammonium, choline, and potassium. For example, useful 2,4-D salts include the 2,4-D choline salt and the 2,4-D dimethyl ammonium salt, and useful glyphosate salts include the glyphosate dimethyl ammonium salt, the glyphosate isopropyl ammonium salt, and the glyphosate potassium salt.

In an example of an aqueous pesticide spray mixture containing water soluble salts of auxinic herbicides and/or water soluble salts of glyphosate, the auxinic herbicide is 2,4-D choline salt or 2,4-D dimethyl ammonium salt and the glyphosate salt is glyphosate dimethyl ammonium salt, glyphosate isopropyl ammonium salt, or glyphosate potassium salt. In another example of an aqueous herbicide spray mixture, the herbicide is an auxinic herbicide and the auxinic herbicide is 2,4-D choline salt or 2,4-D dimethyl ammonium salt, the glyphosate salt is glyphosate dimethyl ammonium salt, glyphosate isopropyl ammonium salt, or glyphosate potassium salt, and the fatty acid alkyl ester, triglyceride fatty acid ester and/or the petroleum derived oil is methyl caproate, methyl caprylate, methyl caprate, methyl laurate, methyl myristate, methyl palmitate, methyl stearate, methyl oleate, methyl linoleate, methyl linolenate, soybean oil, rapeseed oil, olive oil, almond oil, canola oil, omega-9 canola oil, castor oil, sunflower seed oil, coconut oil, corn oil, cotton seed oil, linseed oil, palm oil, peanut oil, safflower oil, sesame oil, tung oil, an aromatic hydrocarbon, a paraffinic hydrocarbon, or mixtures thereof.

In a further example of an aqueous pesticide spray mixture containing water soluble salts of auxinic herbicides and/or water soluble salts of glyphosate, the auxinic herbicide is 2,4-D choline salt, the glyphosate salt is glyphosate dimethyl ammonium salt, and the fatty acid alkyl ester, triglyceride fatty acid ester and/or the petroleum derived oil is methyl caproate, methyl caprylate, methyl caprate, methyl laurate, methyl myristate, methyl palmitate, methyl stearate, methyl oleate, methyl linoleate, methyl linolenate, soybean oil, rapeseed oil, olive oil, castor oil, sunflower seed oil, almond oil, canola oil, omega-9 canola oil, coconut oil, corn oil, cotton seed oil, linseed oil, palm oil, peanut oil, safflower oil, sesame oil, tung oil, an aromatic hydrocarbon, a paraffinic hydrocarbon, or mixtures thereof.

The optimum spray droplet size depends on the application for which the pesticide composition is used. If droplets are too large, there will be less coverage by the spray; i.e, large droplets will land in certain areas while areas in between will receive little or no spray coverage. The maximum acceptable droplet size may depend on the amount of composition being applied per unit area and the need for uniformity in spray coverage. Smaller droplets provide more even coverage, but are more prone to drift during spraying. Thus, application parameters such as uniformity in spray coverage must be balanced against the tendency for smaller droplets to drift. For example, if it is particularly windy during spraying, larger droplets may be needed to reduce drift, whereas on a calmer day smaller droplets may be acceptable.

In addition to the physical properties of a particular aqueous pesticide composition, spray droplet size may also depend on the spray apparatus, e.g., nozzle size and configuration. The reduction in spray drift may result from a variety of factors including a reduction in the production of fine spray droplets (<150 µm minimum diameter) and an increase in the volume median diameter (VMD) of the spray droplets. In any event, for a given spray apparatus, application, and conditions, and based on the fatty acid alkyl ester, and/or triglyceride fatty acid ester, the median diameter of the plurality of spray droplets created using the compositions and methods described herein is increased above that of a spray composition that does not include the fatty acid alkyl ester, triglyceride fatty acid ester, or petroleum derived oil as described herein.

In addition to the methods described above, aqueous pesticide concentrate compositions are also described. As used herein aqueous pesticide concentrate compositions are solutions containing high concentrations of an aqueous pesticide spray component described above, i.e., one or more water soluble herbicide salts and a fatty acid alkyl ester, triglyceride fatty acid ester, and/or a petroleum derived oil. The aqueous concentrate compositions are intended to be diluted to provide aqueous pesticide spray mixtures for use, for example, with the methods described herein.

The aqueous pesticide concentrates as described herein may include one or more pesticides that are present in the aqueous concentrates as dissolved solids, suspended solids, capsule suspensions, or emulsified liquids.

The aqueous concentrate compositions described herein include from 5 to 90 weight percent of one or more water soluble salts of a pesticide. Additional examples of concentrations for the pesticide incorporated into the aqueous pesticide concentrate mixture described herein include, from 5 to 85 weight percent of the concentrate mixture, from 5 to 80 weight percent of the concentrate mixture, from 5 to 75 weight percent of the concentrate mixture, from 5 to 70 weight percent of the concentrate mixture, from 5 to 65 weight percent of the concentrate mixture, from 5 to 60 weight percent of the concentrate mixture, from 5 to 55 weight percent of the concentrate mixture, from 5 to 50 weight percent of the concentrate mixture, from 5 to 45 weight percent of the concentrate mixture, from 5 to 40 weight percent of the concentrate mixture, from 5 to 35 weight percent of the concentrate mixture, from 5 to weight percent of the concentrate mixture, from 5 to 25 weight percent of the concentrate mixture, and from 5 to 20 weight percent of the concentrate mixture. Further examples of concentrations for the pesticide incorporated into the aqueous pesticide concentrate mixture described herein include, from 10 to 90 weight percent of the concentrate mixture, from 15 to 90 weight percent of the concentrate mixture, from 20 to 90 weight percent of the concentrate mixture, from 25 to 90 weight percent of the concentrate mixture, from 30 to 90 weight percent of the concentrate mixture, from 35 to 90 weight percent of the concentrate mixture, from 40 to 90 weight percent of the concentrate mixture, from 45 to 90 weight percent of the concentrate mixture, from 50 to 90 weight percent of the concentrate mixture, from 55 to 90 weight percent of the concentrate mixture, from 60 to 90 weight percent of the concentrate mixture, from 65 to 90 weight percent of the concentrate mixture, from 70 to 90 weight percent of the concentrate mixture, from 75 to 90 weight percent of the concentrate mixture, from 80 to 90 weight percent of the concentrate mixture, and from 85 to 90 weight percent of the concentrate mixture. More examples of concentrations for the pesticide incorporated into the aqueous pesticide concentrate mixture described herein include, from 10 to 85 weight percent of the concentrate mixture, from 15 to 80 weight percent of the concentrate mixture, from 20 to 75 weight percent of the concentrate mixture, from 25 to 75 weight percent of the concentrate mixture, from 30 to 70 weight percent of the concentrate mixture, from 35 to 65 weight percent of the concentrate mixture, from 40 to 60 weight percent of the concentrate mixture, from 45 to 60 weight percent of the concentrate mixture, from 40 to 55 weight percent of the concentrate mixture, and from 45 to 55 weight percent of the concentrate mixture.

The aqueous concentrate compositions described herein include from 0.1 to 20 weight percent of a surfactant. Additional examples of concentrations for the surfactant incorporated into the aqueous pesticide concentrate mixture described herein include, from 0.1 to 19 weight percent of the concentrate mixture, from 0.1 to 18 weight percent of the concentrate mixture, from 0.1 to 17 weight percent of the concentrate mixture, from 0.1 to 16 weight percent of the concentrate mixture, from 0.1 to 15 weight percent of the concentrate mixture, from 0.1 to 14 weight percent of the concentrate mixture, from 0.1 to 13 weight percent of the concentrate mixture, from 0.1 to 12 weight percent of the concentrate mixture, from 0.1 to 11 weight percent of the concentrate mixture, from 0.1 to 10 weight percent of the concentrate mixture, from 0.1 to 9 weight percent of the concentrate mixture, from 0.1 to 8 weight percent of the concentrate mixture, from 0.1 to 7 weight percent of the concentrate mixture, from 0.1 to 6 weight percent of the concentrate mixture, from 0.1 to 5 weight percent of the concentrate mixture, from 0.1 to 4.5 weight percent of the concentrate mixture, from 0.1 to 4 weight percent of the concentrate mixture, from 0.1 to 3.5 weight percent of the concentrate mixture, from 0.1 to 3 weight percent of the concentrate mixture, from 0.1 to 2.5 weight percent of the concentrate mixture, from 0.1 to 2 weight percent of the concentrate mixture, from 0.1 to 1.5 weight percent of the concentrate mixture, and from 0.1 to 1 weight percent of the concentrate mixture. Further examples of concentrations for the surfactant incorporated into the aqueous pesticide concentrate mixture described herein include, from 0.2 to 20 weight percent of the concentrate mixture, from 0.3 to 20 weight percent of the concentrate mixture, from 0.4 to 20 weight percent of the concentrate mixture, from 0.5 to 20 weight percent of the concentrate mixture, from 0.6 to 20 weight percent of the concentrate mixture, from 0.7 to 20 weight percent of the concentrate mixture, from 0.8 to 20 weight percent of the concentrate mixture, from 0.9 to 20 weight percent of the concentrate mixture, from 1 to 20 weight percent of the concentrate mixture, from 1.5 to 20 weight percent of the concentrate mixture, from 2 to 20 weight percent of the concentrate mixture, from 3 to 20 weight percent of the concentrate mixture, from 4 to 20 weight percent of the concentrate mixture, from 5 to weight percent of the concentrate mixture, from 6 to 20 weight percent of the concentrate mixture, from 7 to 20 weight percent of the concentrate mixture, from 8 to 20 weight percent of the concentrate mixture, from 9 to 20 weight percent of the concentrate mixture, from 10 to 20 weight percent of the concentrate mixture, from 11 to 20 weight percent of the concentrate mixture, from 12 to 20 weight percent of the concentrate mixture, from 13 to 20 weight percent of the concentrate mixture, from 14 to 20 weight percent of the concentrate mixture, from 15 to 20 weight percent of the concentrate mixture, from 16 to 20 weight percent of the concentrate mixture, from 17 to 20 weight percent of the concentrate mixture, from 18 to 20 weight percent of the concentrate mixture, and from 19 to 20 weight percent of the concentrate mixture. More examples of concentrations for the surfactant incorporated into the aqueous pesticide concentrate mixture described herein include, from 0.2 to 19 weight percent of the concentrate mixture, from 0.3 to 18 weight percent of the concentrate mixture, from 0.4 to 17 weight percent of the concentrate mixture, from 0.5 to 16 weight percent of the concentrate mixture, from 0.6 to 15 weight percent of the concentrate mixture, from 0.7 to 14 weight percent of the concentrate mixture, from 0.8 to 13 weight percent of the concentrate mixture, from 0.9 to 12 weight percent of the concentrate mixture, from 1 to 11 weight percent of the concentrate mixture, from 2 to 10 weight percent of the concentrate mixture, from 2 to 9 weight percent of the concentrate mixture, from 2 to 8 weight percent of the concentrate mixture, from 2 to 7 weight percent of the concentrate mixture, from 2 to 6 weight percent of the concentrate mixture, from 2 to 5 weight percent of the concentrate mixture, from 2 to 4 weight percent of the concentrate mixture, and from 2 to 3 weight percent of the concentrate mixture.

The aqueous concentrate compositions described herein include from 0.1 to 20 weight percent of a fatty acid alkyl ester, triglyceride fatty acid ester, and/or petroleum derived oil. Additional examples of concentrations for the fatty acid alkyl ester, triglyceride fatty acid ester, and/or petroleum derived oil incorporated into the aqueous pesticide concentrate mixture described herein include, from 0.1 to 19 weight percent of the concentrate mixture, from 0.1 to 18 weight percent of the concentrate mixture, from 0.1 to 17 weight percent of the concentrate mixture, from 0.1 to 16 weight percent of the concentrate mixture, from 0.1 to 15 weight percent of the concentrate mixture, from 0.1 to 14 weight percent of the concentrate mixture, from 0.1 to 13 weight percent of the concentrate mixture, from 0.1 to 12 weight percent of the concentrate mixture, from 0.1 to 11 weight percent of the concentrate mixture, from 0.1 to 10 weight percent of the concentrate mixture, from 0.1 to 9 weight percent of the concentrate mixture, from 0.1 to 8 weight percent of the concentrate mixture, from 0.1 to 7 weight percent of the concentrate mixture, from 0.1 to 6 weight percent of the concentrate mixture, from 0.1 to 5 weight percent of the concentrate mixture, from 0.1 to 4.5 weight percent of the concentrate mixture, from 0.1 to 4 weight percent of the concentrate mixture, from 0.1 to 3.5 weight percent of the concentrate mixture, from 0.1 to 3 weight percent of the concentrate mixture, from 0.1 to 2.5 weight percent of the concentrate mixture, from 0.1 to 2 weight percent of the concentrate mixture, from 0.1 to 1.5 weight percent of the concentrate mixture, and from 0.1 to 1 weight percent of the concentrate mixture. Further examples of concentrations for the fatty acid alkyl ester, triglyceride fatty acid ester, and/or the petroleum derived oil incorporated into the aqueous pesticide concentrate mixture described herein include, from 0.2 to 20 weight percent of the concentrate mixture, from 0.3 to 20 weight percent of the concentrate mixture, from 0.4 to 20 weight percent of the concentrate mixture, from 0.5 to 20 weight percent of the concentrate mixture, from 0.6 to 20 weight percent of the concentrate mixture, from 0.7 to 20 weight percent of the concentrate mixture, from 0.8 to 20 weight percent of the concentrate mixture, from 0.9 to 20 weight percent of the concentrate mixture, from 1 to 20 weight percent of the concentrate mixture, from 1.5 to 20 weight percent of the concentrate mixture, from 2 to 20 weight percent of the concentrate mixture, from 3 to 20 weight percent of the concentrate mixture, from 4 to 20 weight percent of the concentrate mixture, from 5 to 20 weight percent of the concentrate mixture, from 6 to 20 weight percent of the concentrate mixture, from 7 to 20 weight percent of the concentrate mixture, from 8 to 20 weight percent of the concentrate mixture, from 9 to 20 weight percent of the concentrate mixture, from 10 to 20 weight percent of the concentrate mixture, from 11 to 20 weight percent of the concentrate mixture, from 12 to 20 weight percent of the concentrate mixture, from 13 to 20 weight percent of the concentrate mixture, from 14 to 20 weight percent of the concentrate mixture, from 15 to 20 weight percent of the concentrate mixture, from 16 to 20 weight percent of the concentrate mixture, from 17 to 20 weight percent of the concentrate mixture, from 18 to 20 weight percent of the concentrate mixture, and from 19 to 20 weight percent of the concentrate mixture. More examples of concentrations for the fatty acid alkyl ester, triglyceride fatty acid ester, and/or the petroleum derived oil incorporated into the aqueous pesticide concentrate mixture described herein include, from 0.2 to 19 weight percent of the concentrate mixture, from 0.3 to 18 weight percent of the concentrate mixture, from 0.4 to 17 weight percent of the concentrate mixture, from 0.5 to 16 weight percent of the concentrate mixture, from 0.6 to 15 weight percent of the concentrate mixture, from 0.7 to 14 weight percent of the concentrate mixture, from 0.8 to 13 weight percent of the concentrate mixture, from 0.9 to 12 weight percent of the concentrate mixture, from 1 to 11 weight percent of the concentrate mixture, from 2 to 10 weight percent of the concentrate mixture, from 2 to 9 weight percent of the concentrate mixture, from 2 to 8 weight percent of the concentrate mixture, from 2 to 7 weight percent of the concentrate mixture, from 2 to 6 weight percent of the concentrate mixture, from 2 to 5 weight percent of the concentrate mixture, from 2 to 4 weight percent of the concentrate mixture, and from 2 to 3 weight percent of the concentrate mixture.

The aqueous concentrate compositions can be stored in suitable containers as will be readily recognized by one of skill in the art and can be, for example, solutions, emulsions, or suspensions.

In an example of an aqueous pesticide concentrate composition, the pesticide is a herbicide that is an auxinic herbicide and the auxinic herbicide is 2,4-D choline salt or 2,4-D dimethyl ammonium salt. In another example of an aqueous pesticide concentrate composition, the pesticide is a herbicide that is an auxinic herbicide and the auxinic herbicide is 2,4-D choline salt or 2,4-D dimethyl ammonium salt, and the fatty acid alkyl ester, triglyceride fatty acid ester, and/or petroleum derived oil is methyl caproate, methyl caprylate, methyl caprate, methyl laurate, methyl myristate, methyl palmitate, methyl stearate, methyl oleate, methyl linoleate, methyl linolenate, soybean oil, rapeseed oil, olive oil, castor oil, sunflower seed oil, almond oil, canola oil, omega-9 canola oil, coconut oil, corn oil, cotton seed oil, linseed oil, palm oil, peanut oil, safflower oil, sesame oil, tung oil, an aromatic hydrocarbon, a paraffinic hydrocarbon, or mixtures thereof. In a further example of an aqueous pesticide concentrate composition, the pesticide is a herbicide that is an auxinic herbicide and the auxinic herbicide is 2,4-D choline salt and the fatty acid alkyl ester, triglyceride fatty acid ester, and/or petroleum derived oil is methyl caproate, methyl caprylate, methyl caprate, methyl laurate, methyl myristate, methyl palmitate, methyl stearate, methyl oleate, methyl linoleate, methyl linolenate, soybean oil, rapeseed oil, olive oil, castor oil, sunflower seed oil, almond oil, canola oil, omega-9 canola oil, coconut oil, corn oil, cotton seed oil, linseed oil, palm oil, peanut oil, safflower oil, sesame oil, tung oil, an aromatic hydrocarbon, a paraffinic hydrocarbon, or mixtures thereof.

The compositions described herein may additionally contain surfactants. The surfactants may be anionic, cationic, or nonionic in character. For example, compositions as described herein that include glyphosate can optionally include an efficacy enhancing surfactant. Examples of typical surfactants include alcohol-alkylene oxide addition products, such as tridecyl alcohol-$C_{16}$ ethoxylate; sorbitol esters, such as sorbitol oleate; quaternary amines, such as lauryl trimethylammonium chloride; ethoxylated amines, such as tallowamine ethoxylated; betaine surfactants, such as cocoamidopropyl betaine; fatty acid amidopropyl dimethylamine surfactants such as cocoamidopropyl dimethylamine; alkylpolyglycoside surfactants; polyethylene glycol esters of fatty acids, such as polyethylene glycol stearate; and fatty acid esters of polyglycerol.

The additional surfactant or mixtures of surfactants optionally used in the described compositions are usually present at a concentration of from about 0.5 to about 20 weight percent of the formulation. Additionally, compositions optionally containing one or more additional compatible ingredients are provided herein. These additional ingredients may include, for example, one or more pesticides or other ingredients, which may be dissolved or dispersed in the composition and may be selected from acaricides, bactericides, fungicides, insecticides, herbicides, herbicide safeners, insect attractants, insect repellents, plant activators, plant growth regulators, and synergists. Also, any other additional ingredients providing functional utility such as, for example, dyes, stabilizers, fragrants, viscosity-lowering additives, compatibility agents, organic co-solvents such as, for example, propylene glycol, propylene glycol ethers and/or ethylene glycol ethers, and freeze-point depressants may be included in these compositions. The use of organic co-solvents in the concentrates and spray solutions described herein may provide freezing-point depression and/or enhanced emulsion stability to these compositions.

The following Examples are presented to illustrate various aspects of the compositions and methods described herein and should not be construed as limitations to the claims.

Example 1

2,4-D Choline Aqueous Emulsion Concentrates with Built-In Natural or Petroleum Derived Oils:

Aqueous herbicide concentrates containing 383 grams acid equivalent per kilogram (gae/kg) of 2,4-D choline, 90 g/kg of a natural or petroleum derived oil, 10 g/kg of ethylenediaminetetraacetic acid choline salt (EDTA-choline; prepared by adding 1028.25 g of EDTA acid and 689.7 g of DI water into 2310.0 g of choline hydroxide solution (45 wt %) and stirring until all solids are dissolved), and 10 g/kg of one or more surfactants were prepared using the ingredients shown in Table 1. A 4-oz vial was first charged with 9.00 g of a natural or petroleum derived oil. To the vial was added, 0.5 g of Atlox® 4912, 0.5 g of Atlas® G-5000, 86.00 g of a 44.5 wt % ae basis 2,4-D choline salt solution in water (prepared by dissolving 4171.0 g of 2,4-D acid flake (technical grade, 97.1 wt %) into 4789.4 g of choline hydroxide solution (45% aqueous solution) under low shear agitation to give a solution with a pH of 7.0 and a density of 1.21 g/mL) and finally 4.00 g of an EDTA-choline aqueous solution (25 wt %). The mixture was then homogenized using a Silverson™ Homogenizer to provide 100 g of a homogenous herbicide concentrate. Eleven emulsion-based 2,4-D concentrates using the oils shown in Table 2 and one aqueous concentrate containing only 2,4-D choline and EDTA-choline (control sample) were prepared in this manner

TABLE 1

Compositions of 2,4-D Aqueous Emulsion Concentrates

| Composition | wt % |
| --- | --- |
| 2,4-D (44.5 wt % AE 2,4-D choline salt solution in water) | 86.00% |
| EDTA-choline (25 wt % solution) | 4.00% |

TABLE 1-continued

Compositions of 2,4-D Aqueous Emulsion Concentrates

| Composition | wt % |
|---|---|
| natural or petroleum derived oil | 9.00% |
| Atlox 4912 | 0.5% |
| Atlas G-5000 | 0.5% |

2,4-D Choline Herbicide Spray Solutions and Spray Droplet Analysis:

The eleven emulsion-based 2,4-D choline concentrates and the one aqueous concentrate containing only 2,4-D choline and EDTA-choline (control sample) were each diluted with water. Spray solutions containing 2% v/v of 2,4-D choline concentrates were prepared by diluting 10 mL of each of the twelve 2,4-D choline concentrates with 490 mL of deionized water. All diluted spray solutions were lightly shaken by hand until each sample was homogenous. The twelve herbicide spray solutions and one control sample without an emulsion phase were sprayed using a Teejet® 8002 flat fan nozzle (Teejet Technologies; Wheaton, IL) at 40 psi (276 kiloPascal) and the spray droplet size distribution measurement was made with a Sympatec Helos/KF high resolution laser diffraction particle sizer with an R7 lens (Sympatec GmbH; Clausthal-Zellerfeld, Germany) The tip of the nozzle was situated 12 inches (30.5 centimeters) above the path of the laser beam of the Sympatec particle sizer. The percentage of driftable fines was expressed as the volume percentage of spray droplets below 150 μm volume mean diameter (VMD) as shown in Table 2.

TABLE 2

Spray Droplet Analysis of 2,4-D Herbicide Sprays

| | Herbicide Spray Droplet Analysis | |
|---|---|---|
| Natural or Petroleum Derived Oil Used[1] | Spray Droplet VMD, μm | Volume Percentage of Driftable Fines <150 μm VMD |
| none | 163 | 44 |
| Stepan® 108 | 251 | 17 |
| Isopar™ M | 263 | 19 |
| Escaid™ 110 | 272 | 16 |
| Exxsol™ D60 | 263 | 17 |
| Aromatic 100 | 277 | 16 |
| Agnique® ME12-18 | 259 | 17 |
| Agnique® ME18-U | 263 | 17 |
| Steposol® C42 | 266 | 16 |
| canola oil | 271 | 15 |
| soybean oil | 280 | 15 |

[1]Stepan® 108 and Steposol® C42 are available from Stepan (Northfield, IL); Isopar™ M, Escaid™ 110, Exxsol™ D60 and Aromatic 100 are all available from ExxonMobil Chemical (Houston, TX); Agnique® ME12-18 and Agnique® ME18-U are available from BASF (Florham Park, NJ).

Example 2

Glyphosate Potassium Aqueous Emulsion Concentrates with Built-In Natural or Petroleum Derived Oils:

Aqueous herbicide concentrates containing 358.2 grams acid equivalent per kilogram (gae/kg) of glyphosate potassium, 90 g/kg of a natural or petroleum derived oil, and 10 g/kg of one or more surfactants were prepared as follows using the ingredients shown in Table 3. A 4-oz vial was first charged with 9.00 g of dispersed oil. To the vial was added, 0.5 g of Atlox® 4912, 0.5 g of Atlas® G-5000, and 90.00 g of Roundup PowerMax® (containing 540 gae/L of glyphosate potassium; Monsanto; St. Louis, MO). The mixture was then homogenized using a Silverson™ Homogenizer to provide 100 g of a homogenous herbicide concentrate. Eleven emulsion-based glyphosate concentrates using the oils shown in Table 4 and one aqueous concentrate containing only commercial Roundup® PowerMax® (glyphosate K) were prepared in this manner

TABLE 3

Composition of Glyphosate Aqueous Emulsion Concentrates

| Composition | wt % |
|---|---|
| Roundup® Powermax (39.8 wt % AE glyphosate potassium solution in water) | 90.00% |
| natural or petroleum derived oil | 9.00% |
| Atlox 4912 | 0.5% |
| Atlas G-5000 | 0.5% |

Glyphosate Herbicide Spray Solutions and Spray Droplet Analysis:

The eleven emulsion-based glyphosate potassium concentrates and the one aqueous concentrate containing only commercial Roundup® PowerMax (glyphosate potassium) were each diluted with water. Spray solutions containing 2% v/v glyphosate potassium concentrate were prepared by diluting 10 mL of each of the twelve glyphostate concentrates with 490 mL of deionized water. All diluted spray solutions were lightly shaken by hand until each sample was homogenous. The twelve herbicide spray solutions and one control samples without an emulsion phase were sprayed using the equipment and procedure described in Example 1. The percentage of driftable fines was expressed as the volume percentage of spray droplets below 150 μm volume mean diameter (VMD) as shown in Table 4.

TABLE 4

Spray Droplet Analysis of Glyphosate Herbicide Sprays

| | Herbicide Spray Droplet Analysis | |
|---|---|---|
| Natural or Petroleum Derived Oil Used | Spray Droplet VMD, μm | Volume Percentage of Driftable Fines <150 μm VMD |
| (water) | 147 | 51 |
| Stepan 108 | 249 | 19 |
| Isopar M | 239 | 20 |
| Escaid 110 | 246 | 19 |
| Exxsol D60 | 246 | 19 |
| Aromatic 100 | 245 | 19 |
| Agnique ME12-18 | 248 | 18 |
| Agnique ME18-U | 255 | 18 |
| Steposol C42 | 237 | 21 |
| Canola oil | 259 | 17 |
| Soybean oil | 257 | 18 |

The present invention is not limited in scope by the embodiments disclosed herein which are intended as illustrations of a few aspects of the invention and any embodiments which are functionally equivalent are within the scope of this invention. Various modifications of the compositions and methods in addition to those shown and described herein will become apparent to those skilled in the art and are intended to fall within the scope of the appended claims. Further, while only certain representative combinations of the composition components and method steps disclosed herein are specifically discussed in the embodiments above, other combinations of the composition components and method steps will become apparent to those skilled in the art and also are intended to fall within the scope of the appended claims. Thus a combination of components or method steps may be explicitly mentioned herein; however, other combinations of components and method steps are included, even though not explicitly stated. The term comprising and variations thereof as used herein is used synonymously with the term including and variations thereof and are open, non-limiting terms.

What is claimed is:

1. An aqueous pesticide concentrate, comprising:
from 5 to 90 weight percent of a pesticide;
from 0.1 to 20 weight percent of a surfactant; and
from 0.1 to 20 weight percent of a petroleum derived oil,
wherein the petroleum derived oil is dispersed as discrete droplets in the aqueous pesticide concentrate to form a stable oil-in-water emulsion with a droplet size from about 0.01 micron (μm) to about 20 μm;
wherein the petroleum derived oil is an aromatic or a paraffinic hydrocarbon, or mixtures thereof,
wherein the surfactant is a mixture of an ABA block copolymer having a hydrophilic portion of polyethylene oxide and a hydrophobic portion of poly(12-hydroxystearate), and an AB block copolymer containing EO and PO blocks; and
wherein the pesticide is a water soluble salt of an auxinic herbicide selected from a water soluble salt of 2,4-D, a water soluble salt of triclopyr, a water soluble salt of dicamba, or mixtures thereof.

2. The aqueous concentrate composition of claim 1, wherein the auxinic herbicide is a water soluble salt of 2,4-D.

3. The aqueous concentrate composition of claim 2, wherein the auxinic herbicide is 2,4-D choline salt.

4. The aqueous concentrate composition of claim 2, wherein the auxinic herbicide is 2,4-D dimethyl ammonium salt.

5. The aqueous concentrate composition of claim 2, wherein the auxinic herbicide is 2,4-D choline salt or 2,4-D dimethyl ammonium salt.

6. A method for reducing spray drift during pesticide spray application to control pests comprising:
providing an aqueous pesticide concentrate comprising:
from 5 to 90 weight percent of a pesticide;
from 0.1 to 20 weight percent of a surfactant;
from 0.1 to 20 weight percent of a petroleum derived oil,
wherein the petroleum derived oil is dispersed as discrete droplets in the aqueous pesticide concentrate to form a stable oil-in-water emulsion with a mean droplet size from about 0.01 micron (μm) to about 20 μm;
adding the aqueous pesticide concentrate to a spray tank containing water to form a stable emulsion; and
spraying the stable emulsion to control one or more pests,
wherein the petroleum derived oil is an aromatic or a paraffinic hydrocarbon, or mixtures thereof,
wherein the surfactant is a mixture of an ABA block copolymer having a hydrophilic portion of polyethylene oxide and a hydrophobic portion of poly(12-hydroxystearate) and an AB block copolymer containing EO and PO blocks, and
wherein the pesticide is a water soluble salt of an auxinic herbicide selected from a water soluble salt of 2,4-D, a water soluble salt of triclopyr, a water soluble salt of dicamba, or mixtures thereof.

7. The method of claim 6, wherein the auxinic herbicide is a water soluble salt of 2,4-D.

8. The method of claim 6, wherein the auxinic herbicide is 2,4-D choline salt.

9. The method of claim 6, wherein the auxinic herbicide is 2,4-D dimethyl ammonium salt.

10. The method of claim 6, wherein the aqueous pesticide concentrate is an auxinic herbicide concentrate that is added to a spray tank of water, and further comprises an additional herbicide.

11. The method of claim 10, wherein the additional herbicide is glyphosate or glufosinate.

12. The method of claim 11, wherein the auxinic herbicide is 2,4-D choline salt or 2,4-D dimethyl ammonium salt and the glyphosate is glyphosate dimethyl ammonium salt, glyphosate isopropyl ammonium salt, or glyphosate potassium salt.

13. The method of claim 11, wherein the auxinic herbicide is 2,4-D choline salt or 2,4-D dimethyl ammonium salt, the glyphosate is glyphosate dimethyl ammonium salt, glyphosate isopropyl ammonium salt or glyphosate potassium salt, and the glufosinate salt is glufosinate ammonium salt.

14. The method of claim 11, wherein the auxinic herbicide is 2,4-D choline salt, and the glyphosate is glyphosate dimethyl ammonium salt.

15. The method of claim 11, wherein the auxinic herbicide is 2,4-D choline salt, and the glyphosate is glyphosate dimethyl ammonium salt or glyphosate potassium salt.

* * * * *